United States Patent [19]

Hauk

[11] Patent Number: 4,782,627

[45] Date of Patent: Nov. 8, 1988

[54] PLANT FEEDING AND WATERING METHOD AND APPARATUS

[76] Inventor: Thomas D. Hauk, 10422 El Dorado Way, Los Alamitos, Calif. 90720

[21] Appl. No.: 931,405

[22] Filed: Nov. 14, 1986

[51] Int. Cl.$^4$ ............................................. A01G 27/00
[52] U.S. Cl. .......................................... 47/81; 47/48.5
[58] Field of Search ................... 47/81, 79, 48.5, 80; 251/234, 228, 298

[56] References Cited

U.S. PATENT DOCUMENTS

| | | | |
|---|---|---|---|
| 1,029,107 | 6/1912 | Crouls . | |
| 1,231,975 | 7/1917 | Weitzel . | |
| 1,231,976 | 7/1917 | Weitzel . | |
| 1,400,628 | 12/1921 | Rudolph . | |
| 1,620,277 | 3/1927 | Myers . | |
| 2,651,884 | 9/1953 | Werner | 47/38 |
| 2,747,332 | 5/1956 | Morehouse | 47/38 |
| 2,799,121 | 7/1957 | Modeweg | 47/38 |
| 3,005,287 | 10/1961 | Dudley | 47/25 |
| 3,069,807 | 12/1962 | Wall | 47/38 |
| 3,106,043 | 10/1963 | Ferrano | 47/38 |
| 3,261,125 | 7/1966 | Arkebauer | 47/38.1 |
| 3,613,310 | 10/1971 | Rynberk | 47/48.5 |
| 3,972,629 | 8/1976 | Whalen, Jr. | 401/199 |
| 4,067,143 | 1/1978 | Alwell | 47/79 |
| 4,087,938 | 5/1978 | Koch | 473/48.5 |
| 4,115,951 | 9/1978 | Becker et al. | 47/81 |
| 4,268,992 | 5/1981 | Scharf, Sr. | 47/23 |
| 4,300,309 | 11/1981 | Mincy | 47/48.5 |
| 4,336,666 | 6/1982 | Caso | 47/48.5 |
| 4,430,829 | 2/1984 | Zeltner et al. | 47/81 |

Primary Examiner—Robert A. Hafer
Assistant Examiner—Kevin G. Rooney
Attorney, Agent, or Firm—Gausewitz, Carr & Rothenberg

[57] ABSTRACT

A plant watering system and method including a container for providing a reservoir of fluid, which may include liquid nutrients as well as water, the container being attachable to a plant receptacle adjacent the upper end thereof. A first absorbent wick member communicates with the fluid within the reservoir, and exits the upper end of the container and angularly downwardly into a control trough where it terminates at a point above the soil or other potting material. The control receptacle is provided, at the opposite side thereof, with a generally vertically extending plate-shaped wick retention member pivotally connected to the trough housing at the lower end thereof, the upper portion being provided with a member detentably engaging side edges of the receptacle. A spring member beneath the absorbent member biases the absorbent member toward the plate-shaped member. A second absorbent wick member has one end thereof interposed between the first absorbent member and the plate-shaped member, with a major portion end thereof embedded slightly beneath the soil. Angular pivoting of the plate-shaped member controls the amount of surface area of contact between the first and second absorbent members for controlling fluid flow by capillary action from the reservoir through the first and second absorbent members to the soil.

23 Claims, 3 Drawing Sheets

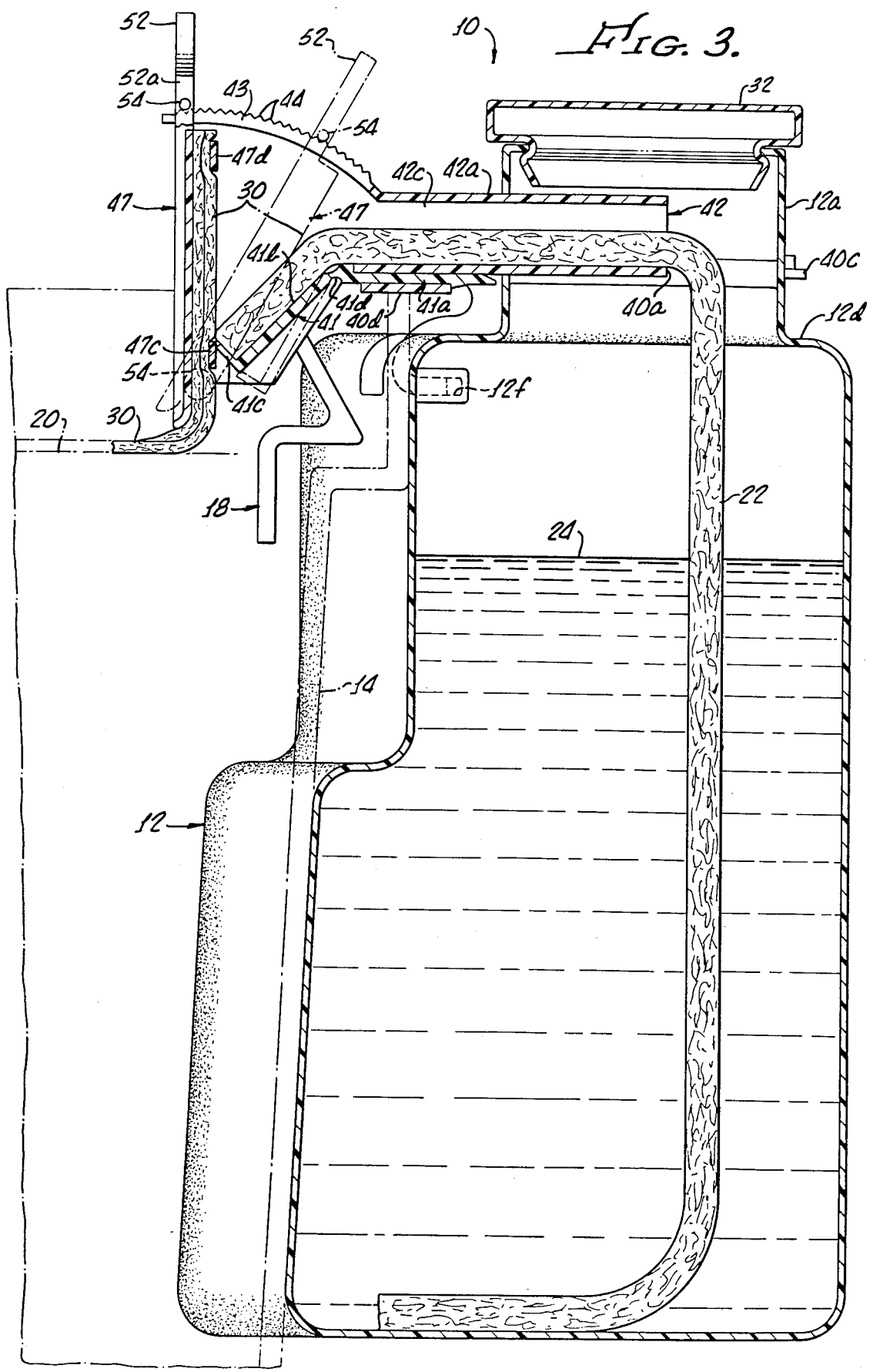

PLANT FEEDING AND WATERING METHOD AND APPARATUS

BACKGROUND OF THE INVENTION

The background of the invention will be discussed in two parts.

1. Field of the Invention

This invention relates to watering systems, and more particularly to a method and apparatus for adjustable unattended feeding and watering of potted plants.

2. Description of the Prior Art

The feeding and watering of potted plants, in many instances, is a hit or miss proposition, that is, depending on the particular owner of the plant, the plant may or may not be watered on a proper schedule. Furthermore, the watering may involve more or less than the plant requires, and with most plants, different schedules and amounts are attempted to arrive at the proper watering. Devices have been developed in an attempt to provide some regulated flow of water, depending on the moisture content within the soil. However, different plants require different soil moisture contents. Some such methods employ drip irrigation, or utilization of wick members for transferring water between a reservoir and the soil.

One such watering system is shown and described in U.S. Pat. No. 1,029,107, entitled "Plant Watering Device", which issued to Couls on June 11, 1912, such device consisting of an annular reservoir having a plurality of holes therein and configured for being buried in the ground about the roots of a tree with an above ground tube filler portion. Water control is effected through a float member.

Another watering system for potted plants is shown in U.S. Pat. No. 1,231,975, entitled "Watering Attachment for Flower Pots", such patent being issued to Weitzel, 2d, on July 3, 1917. In accordance with this device, an annular reservoir is configured for attachment to the upper part of the pot, with a threadable valve member controlling the drip rate of water therefrom through a tube within the soil of the plant. Another such device is shown in another Weitzel, 2d, patent, that being U.S. Pat. No. 1,231,976, entitled "Regulator for Pot Watering Devices", issued on July 3, 1917, the patent being directed to a another regulated drip watering device.

U.S. Pat. No. 1,400,628, issued Dec. 20, 1921, to Rudolph, for "Self Irrigating Flowerpot", the patent being directed to a flower pot with an integral or attachable annular reservoir, with an absorbent member in flow communication with the water therein and with the soil.

U.S. Pat. No. 1,620,277, entitled "Magazine Lubricating Means", issued on Mar. 8, 1927, to Myers, and discloses an oil lubrication device using a wick member for transferring oil from a reservoir to an opening in flow communication with a bearing.

U.S. Pat. No. 2,651,884, entitled "Self-Irrigating Plant Receptacle", issued on Sept. 15, 1953, to Werner, and discloses a receptacle with a watering reservoir in the base thereof, with a mechanism for controlling the flow of water to the soil within the receptacle.

U.S. Pat. No. 2,747,332, entitled "Flower Pot Watering Device", issued May 29, 1956, to Morehouse, such patent describing a reservoir with a wick extending from the reservoir to the soil, the soil implanted portion being contained within a tube, with the wick extending therefrom. Regulation of flow is effected by constricting bands adjustably spaced on the wick portion within the reservoir.

U.S. Pat. No. 2,799,121, entitled "Plant Irrigating Device", issued July 16, 1957, to Modeweg, and discloses a system using a tub-shaped reservoir with a plurality of water transfer devices, each including a tube through which passes a wick, with the tube retained on the reservoir by spring hook members, the soil engaging end of the wick including a nozzle member thereabout. Flow control is effected by a wedge member urged into the tube to compress the wick.

U.S. Pat. No. 3,005,287, entitled "Mulch and Plant Feeder", issued Aug. 24, 1961, to Dudley, and discloses an annular plate member having a funnel-shaped cross-section for placement about the base of a tree, or the like, for retaining water and directing the same downwardly through the apex of the funnel.

U.S. Pat. No. 3,069,807, entitled "Device for Watering and Feeding Plants, Flowers, and the Like", issued Dec. 25, 1962, to Wall, such device including a reservoir for attachment to the side of a pot, with a tubular member extending from the reservoir into the lower part of the interior of the pot, with the lowest part having a plurality of openings for dispersing water from the reservoir by combined siphon and capillary action.

U.S. Pat. No. 3,106,043, entitled "Cultivation Tray Having Moisture Control", issued Oct. 8, 1963, to Ferrand, such device having a divided tray with a funnel shaped bottom, with the upper part holding the soil, and the lower part holding water.

U.S. Pat. No. 3,261,125, entitled "System for Controlling the Moisture Content of Soil", issued July 19, 1966, to Arkebauer, and discloses a pot partition for containing water beneath the plant within the pot, with a moisture responsive element controlling flow of water therefrom to the soil.

U.S. Pat. No. 3,613,310, entitled "Water level Indicating and Control Construction", issued Oct. 19, 1971, to Rynberk, and shows telescopically engaged inner and outer tubular members, with the outer member being perforated and insertable into the ground for watering, the inner member being slidable relative thereto.

U.S. Pat. No. 3,972,629, entitled "Marking Devices", issued Aug. 3, 1976, to Whalen, Jr., and discloses a marking device, such as a pen having a tubular body with a felt tip extending out therefrom with an absorbent wick within the body in spaced relation to the felt tip, with a moisture sensitive component expandable and contractable to control flow from the wick to the tip.

U.S. Pat. No. 4,067,143, entitled "Plant Watering Reminder", issued Jan. 10, 1978, to Alwell, and discloses a peripheral removable reservoir attachable to a pot, with perforated tubular members having wicks therein positioned in depending relation to the reservoir for transfer of fluid therefrom.

U.S. Pat. No. 4,087,938, entitled "Tree Watering Device", issued May 9, 1978, to Koch, and shows a radially slotted tub-like irrigator which engages the tree trunk and delivers water thereto in a controlled manner.

U.S. Pat. No. 4,115,951, entitled "Apparatus for Supplying Fluids to Potted Plants", issued Sept. 26, 1978, to Becker, and shows a container having a downwardly angularly depending perforated tubular spiked portion for soil engagement with a wick therein transferring fluid from within the container into the perforated tube, the tube being provided with a variable area aperture at the lower end thereof, with a sliding door, which serves to vary the area of the wick exposed to the soil therethrough, and compress the effective cross-section of the wick at the end thereof.

U.S. Pat. No. 4,268,992, entitled "Tree Protector", issued May 26, 1981, to Scharf, and discloses an annular base member for encircling the base of the tree above ground, and for forming a water retention tray, with perforated tubular spike members depending therefrom into the ground, for both holding the base member in position and for transferring water from the tray to the ground.

U.S. Pat. No. 4,300,309, entitled "Plant Feeding Device", issued Nov. 17, 1981, to Mincy, the device including a soil penetrating porous spike member having a centrally extending opening with a plastic sleeve therein having a longitudinally extending slot for controlling the flow of water therethrough to the porous spike.

U.S. Pat. No. 4,336,666, entitled "Plant Waterers", issued June 29, 1982, to Caso, the device including a toroidal reservoir for placement around the stalk of the plant with perforated tubular spike members depending therefrom into soil engaging contact for transferring fluid therefrom.

U.S. Pat. No. 4,430,829, entitled "Moisture Control Apparatus", issued Feb. 14, 1984, to Zeltner, et al., such device including a reservoir for fluid, with a first fabric to be immersed therein and to move into and out of contact with a second fabric to transfer moisture to the second fabric and then to an absorbent fabric underlying the soil, with the movement into and out of contact being effected by a lever, the position of which is controlled by means of a moisture-responsive stretchable and shrinkable material which senses the moisture condition adjacent the upper region of the soil.

Of the above patents, only three are deemed to be relevant to the invention herein, these being the last mentioned, to Zeltner et al., and U.S. Pat. Nos. 3,972,629 to Whalen, Jr., and 4,115,951, to Becker. The Whalen patent, although directed to a felt tip marker pen, deals with the problems associated with fluid transfer in absorbent materials.

Such prior art devices for plant watering and feeding have tended to be unduly complicated, such as exemplified by Zeltner's device. In the Becker device, the primary method of control is embedded in the soil, thus lending little to ready adjustability.

It is an object of the present invention to provide a new and improved adjustable plant feeding and watering method and apparatus.

SUMMARY OF THE INVENTION

In accordance with a preferred embodiment of the present invention, there is provided a reservoir or container for retaining fluid, which may include liquid nutrients as well as water, the reservoir being attachable to a plant receptacle adjacent the upper end thereof. A first absorbent wick member communicates with the fluid within the reservoir, and exits the upper end of the container and angularly downwardly into a control trough where it terminates at a point above the soil or other potting material. The control receptacle is provided, at the opposite side thereto, with a generally vertically extending plate-shaped wick retention member pivotally connected to the trough housing at the lower end thereof, the upper portion being provided with a member detentably engaging side edges of the receptacle. A spring member beneath the absorbent member biases the absorbent member toward the plate-shaped member. A second absorbent wick member has one end thereof interposed between the first absorbent member and the plate-shaped member, with a major portion end thereof embedded slightly beneath the soil. Angular pivoting of the plate-shaped member controls the amount of surface area of contact between the first and second absorbent members for controlling fluid flow by capillary action from the reservoir through the first and second absorbent members to the soil.

The foregoing and other objects of the invention will become apparent from a reading of the specification, when taken in conjunction with the drawings, in which like reference numerals refer to like elements in the several views.

BRIEF DESCRIPTION OF THE DRAWINGS

FIG. 3 is a cross-sectional view of the apparatus of FIG. 1, as viewed generally along line 3—3 thereof, showing the apparatus assembled to the side of a plant container, and showing the fluid flow from the reservoir to the soil.

DESCRIPTION OF THE PREFERRED EMBODIMENT

Figure 1:
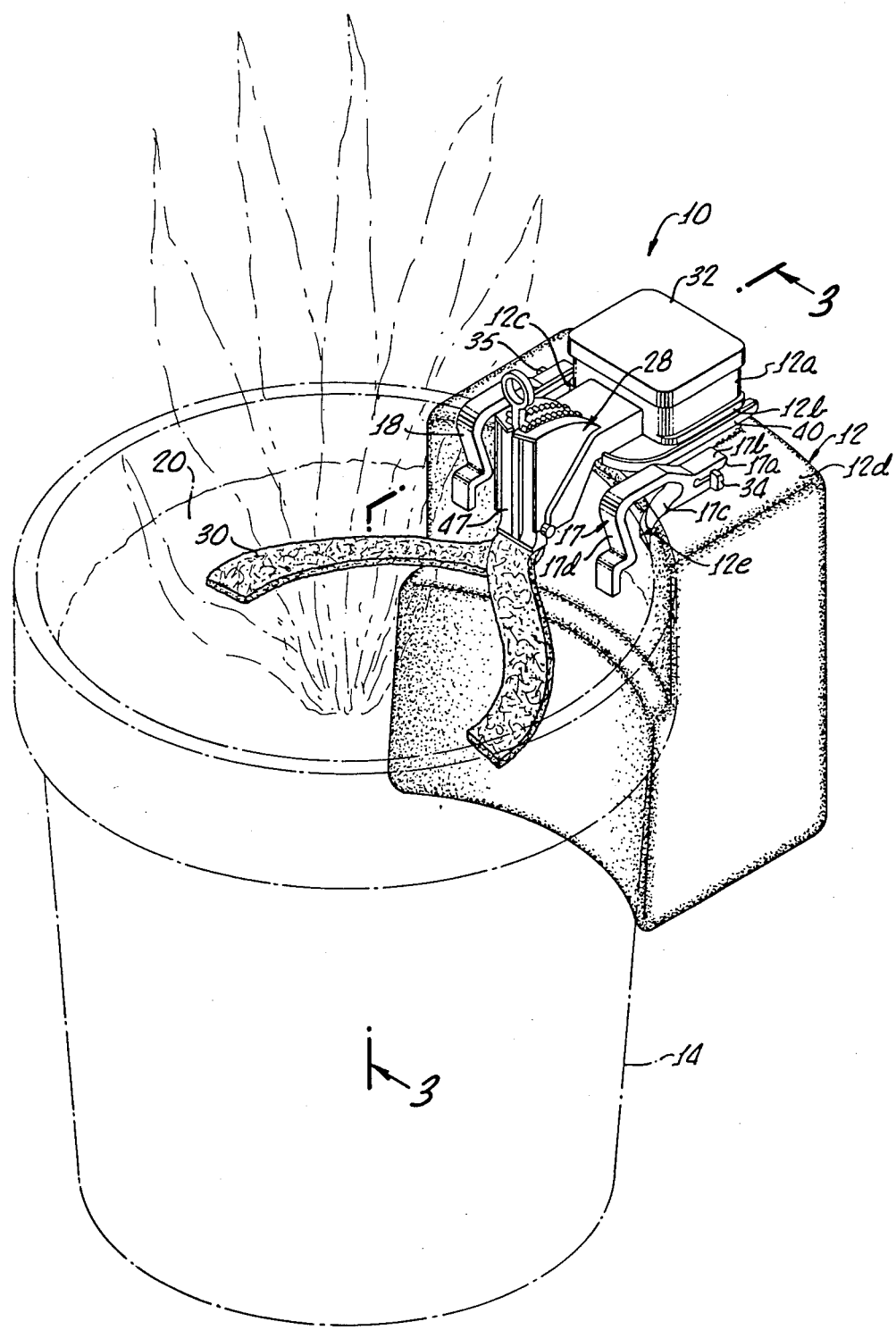
FIG. 1 is a perspective view of the plant feeding and watering apparatus according to the invention, with the plant container shown in phantom illustration.

Referring now to the drawings, and particularly FIG. 1, there is shown a feeding and watering apparatus, generally designated 10, in accordance with a preferred embodiment. The apparatus 10 includes a container 12, which serves as a reservoir for fluid, which may include water as well as liquid nutrients or fertilizer for plant care. In phantom illustration, there is shown a container or receptacle 14, which contains soil or potting aggregate for a plant. The container 12 is suspended from the receptacle 12 by suitable means such as hook members 17 and 18.

Figure 2:
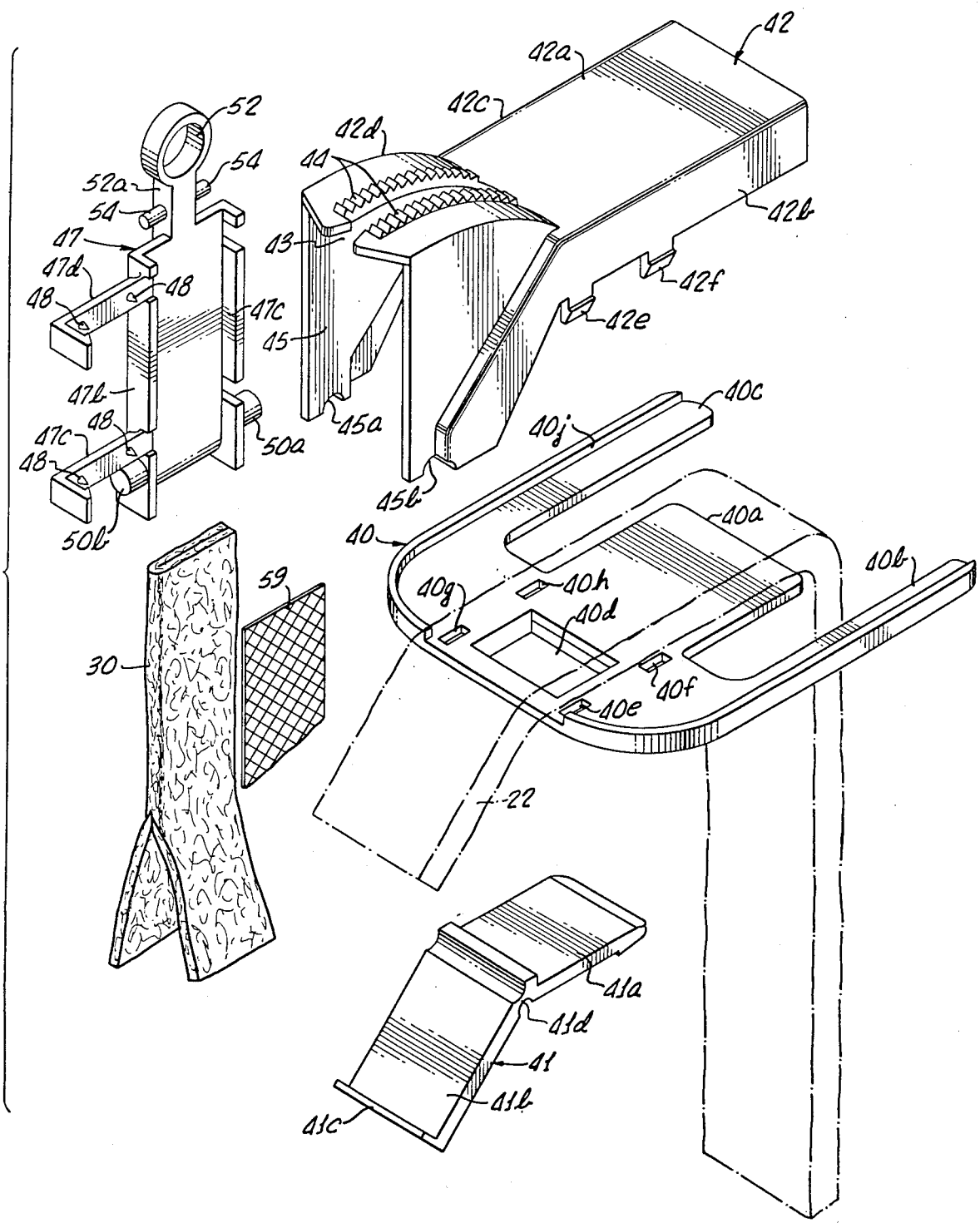
FIG. 2 is an exploded partial view of the fluid flow control trough housing portion of the apparatus of FIG. 1 and the first and second wick members.

By reference also to FIGS. 2 and 3, briefly the fluid from within the container 12 is transferred to the soil or potting aggregate 20 by means of a first absorbent member, or water wick 22 having an end thereof immersed in the fluid solution 24, with the other end extending out from the top of the container 12 and depending into a fluid flow control trough, generally designated 28, with one end of a second absorbent means in the form of a soil wick member 30 in surface abutting relation therewith, with the other end or ends of the wick member 30 positioned within the soil or aggregate 20 in spaced relation to the upper surface thereof, and at a slight depth below the surface. The wick member 30 may be formed as one strip of absorbent material slit lengthwise to place elongate arms 30a and 30b in different locations adjacent the surface of the soil to transfer moisture more efficiently, or alternatively may be formed as two separate strips. As will be hereafter described, means within the fluid flow control tough 28 vary the surface area of contact between the first and second absorbent means, that is water wick 22 and soil wick member 30.

The container 12 is formed preferably of plastic material and is bottle shaped with the bottom exterior thereof configured to somewhat conform to the shape of the plant receptacle 14 whereby the longitudinal centerline of the container 12 is generally vertical. The upper end of container 12 has a neck portion 12a, which is open at the top for receiving a removable cap 32 for refilling the container 12 as needed. The neck portion 12a has formed therein lateral extending groove means 12b and 12c on opposite surfaces thereof. At the forward end of neck portion 12a, that is, in proximity to the plant receptacle 14, there is formed an opening 11 through which the water wick member 22 extends as will be described. Beneath the neck portion 12a, the container 12 has an enlarged lateral surface or shoulder portion 12d, which has eye members 34, 35 formed therein. In the generally vertical surface of container 12 adjacent receptacle 14, a pair of indentations 12e and 12f are formed for coaction with the hook members 17 and 18.

As shown in FIG. 2, by reference to hook member 17, the member 17 includes a first arm 17a configured for being received within the eye member 34, with a spaced detented second arm 17b thereabove for detentingly engaging the upper edge of eye member 34. Extending oppositely from arm 17a is third arm 17c, which has the end thereof arcuately configured for coacting engagement with the indentation 12e of container 12. A resilient fourth generally L-shaped arm 17d extends oppositely from arm 17b with a downwardly depending leg thereof configured for providing a measure of resilience for engagement with the interior of the plant receptacle 14 to thereby suspend the container 12 from the receptacle 14.

The fluid flow control trough 28 is configured of a number of parts, as more fully shown in FIG. 2. A plate member 40 is provided with a centrally disposed tongue portion 40a and generally parallel side legs 40b and 40c coplanar with tongue portion 40a. Tongue portion 40a is dimensioned and configured for having the free end thereof received within opening 11 of container 12 with side legs 40b and 40c slidably and adjustable engaging grooves 12b and 12c on opposite sides of neck portion 12a of container 12. The coaction of the legs 40b and 40c with the grooves 12b and 12c enable the positioning of the housing or fluid flow control trough 28, relative to the container 12. That is, the trough 28 may be moved further from the container 12 for enabling better placement of the soil wick members 30. In alignment with, and forwardly of, tongue portion 40a, plate member 40 is provided with a generally rectangular opening 40d, with detent slots 40e–40h extending through plate member 40 adjacent the four corners of opening 40d. As shown in FIG. 2, a portion of the periphery of the plate member 40 includes a ridge 40j, which has a portion thereof in line with the opening 40d removed. A spring member 41 has a first arm 41a thereof received on the plate member 40 in alignment with, and above the opening 40d, with the exiting end of the water wick 22 overlying the arm 41a. The other arm 41b depends angularly downwardly, and is provided with a foot portion 41c directed in the direction of the bias of spring member 41, that is away from the container 12, with the foot member 41c serving to provide a restraint for the lower end of the wick member 22 when positioned thereon. The spring member 41, along with the other components of the control trough 28 may be formed of plastic, with the spring member 41 having formed therein a "living hinge", that is, a reduced cross-sectional portion 41d configured for resilient flexure of one arm 41b relative to the other arm 41a.

The control trough 28 is covered by a control trough cover member, generally designated 42, which forms part of a housing, and includes an upper surface 42a with depending sides 42b and 42c having tang members 42e and 42f (only two of which are shown) depending from the lower edges thereof for engagement with the detent slots 40e–40h of plate member 40, thus forming a conduit through which the water wick member 22 may pass. The forward end of cover 42 is formed to provide an enlarged housing portion including an arcuate upper surface 42d with a longitudinally extending slot 43 formed therein with aligned ratchet teeth 44 formed on both sides of the slot 43. The forward end of the control trough cover member 42 is configured to form a generally rectangular opening 45, with the lower edges adjacent the opening being arcuately formed, such as at 45a and 45b, the arcuate edges being aligned for defining a pivot axis for an adjustable soil wick retention member 47.

As shown in FIG. 2, the wick retention 47 member has the main body portion generally C-shaped in cross-section, with the back plate 47a being generally planar with spaced short side walls 47b and 47c on opposite long sides thereof, the spacing between side walls 47b and 47c being approximately the width of the soil wick member 30. Integrally formed with the back plate 47a are hinged first and second clamp members 47d and 47e configured for pivoting about the edge adjacent side wall 47b for clamping engagement with the edge adjacent side wall 47c. The surfaces of clamp members 47d and 47e are provided with barbs 48 intermediate the ends thereof for at least partially piercing the wick member 30 for retention of the engaged end of the wick member 30 in abutting non-sliding relation on back plate 47a.

For enabling pivotable assembly of the wick retention member 47 within the arcuately formed portion of the control trough cover member 42, the lower end of member 30 is provided with a pair of aligned outwardly extending axle stub projections 50a and 50b for coaction with arcuate edges 45a and 45b, respectively of cover member 42. The upper portion of wick retention member is provided with an upwardly extending finger grip 52 having a narrow neck portion 52a with aligned detent engaging projections 54 on both sides thereof for frictional coaction with the ratchet teeth 44 with neck portion 52a received in slot 43 when axle stub projections 50a and 50b are in engagement with edges 45a and 45b. The dimensions of wick retention member 47 are such that, with the wick 30 therein and held captive by clamp members 47d and 47e, the side walls 47b and 47c are slidable within the opening 45 of the cover member 42. Retention within the opening 45 is effected at the lower end by the axle projections 50a and 50b, and at the upper end by the coaction of the detent projections 54 with the ratchet teeth 44 above the surface of the slot 43.

The configuration of the housing formed by plate member 40, cover member 42 and wick retention member 47 serves to provide a generally enclosed housing which tends to eliminate, or at least minimize, moisture loss by evaporation at the moisture control interface between wick members 22 and 30. As shown, the configuration and dimensions of the wick retention member 47 substantially close the open end 45 of the cover member 42, with a narrow slotted opening 43 at the upper end for passage therethrough of a narrow neck portion 52a of the wick retention member 47.

Referring now to FIG. 3, in operation, the container 12 is filled with a fluid solution 24, with the water wick member 22 having one end thereof extending down through the container 12 interior, and being immersed in the solution 24. The other end of wick member 22 passes out through the opening 11 in the neck portion 12a, onto the surface of the plate member 40 above the spring member 41, with the extreme end thereof abutting against the foot 41c thereof. By way of illustration, the water wick member 22 requires wicking characteristics sufficient for lifting water to a height consistent with the height of the fluid. By way of example, the container 12 in one configuration has about six inches of water, and for this purpose, the wick 22 is formed of a wool and rayon mixture. The characteristics of the soil wick member 30 must be sufficient to withstand the deteriorating effect of soil, and be able to effectively transfer the fluid from the wick 22 to the soil, and, for this purpose, a polyester wick is utilized. One end of the soil wick member 30 is captively retained by the wick retention member 47. As shown in FIG. 3 in solid lines, with the member 47 generally vertical, the end of water wick member 22 is urged into contact with the adjacent surface of the soil wick member 30. In this position, fluid transfer between the water wick member 22 and the soil wick member 30 is at a minimum due to the limited surface area of overlap. As the wick retention member 47 is pivoted clockwise, as viewed in FIG. 3, the surface area of contact between the two wick members 22 and 30 increases, thereby increasing the volume of moisture transfer from the water wick member 22 to the soil wick member 30. In the dotted line position of the wick retention member 47, the abutting surface area of contact between the two wick members 22 and 30 is at its maximum, that is, the exposed adjacent surfaces are in complete abutting engagement.

As shown in FIG. 3, the foot 41c of the spring member 41 is slightly above and to the right of the pivot axis of member 47 established by the axle projections 50a and 50b. The spring is urging the water wick member 22 toward the soil wick member 30. As the retention member 47 is pivoted clockwise, the foot portion 41c of spring member 41 is urged downwardly and away, thereby varying the surface area of contact.

The degree of volume of moisture transfer may be further controlled in finer increments by interposing a fluid flow control member 59 (shown in FIG. 2) between the adjacent surfaces of wick members 22 and 30. Ideally, for plants, control of the flow rate is desirably between 0.1 to 0.7 cubic inches of fluid per hour. The member 59 may be, for example, a screen or mesh formed of fine mesh nylon or the like, which has a moisture transfer characteristic less than the normally high transfer absorbent materials used for wicks.

By way of illustration, with the materials used for the wick members 22 and 30, as above described, and without the mesh fluid flow control member 59, fluid transfer may fall within the range of 0.2 to 0.7 cubic inches per hour, from a position wherein the abutting wick members are barely in contact, to full surface abutting contact. However, with this flow rate, at the lower end of the flow rate, there would be a surface area of contact of about 0.005 square inches, and at the maximum flow rate, there would be a surface area of contact of about 0.20 square inches. Fine control of this range, in many instances, is difficult with manual control of the wick retention member.

By interposing the fluid flow control member 59 between the wick members 22 and 30, the fluid flow transfer rate range may be broadened, by use of a larger maximum surface area of contact between wick members 22 and 30. By increasing the maximum surface area of contact to 1.0 square inches, and with use of the mesh 59, a range of 0.05 to 0.7 cubic inches per hour is obtainable, with corresponding minimum and maximum surface areas of contact of 0.005 to 1.00 square inches. In this manner, for movement of the wick retention member 47 through one notch, a smaller difference in moisture transfer control is effected, with the member 59, thus providing greater control sensitivity. The member 59 thus acts as a fluid transfer barrier or reducer.

Alternatively, either or both of the wick members 22 and 30 may be formed as a highly absorbent material with a mesh sleeve thereabout, as a means of effecting additional control of moisture transfer, or may be formed of laminated material, each layer of which includes a material of different characteristics to provide controlled dispersion of fluid to the roots of the plant.

Although the embodiment of the watering and feeding apparatus has been shown and described herein in conjunction with a potted plant receptacle 14 and soil therein, the method and apparatus herein described may be conveniently employed with hydroponic gardens, in which the roots of the plants are contained in aggregate or particulate material other than conventional soil, and it is intended that plants having roots thereof in aggregate material shall include soil as well as the aggregate material used in such gardening. Furthermore, while one water wick member 22 has been described and one slit soil wick member 30, it is to be understood that additional wick members may be utilized.

While there has been shown and described a preferred embodiment, it is to be understood that various other adaptations and modifications may be made without departing from the spirit and scope of the invention.

What is claimed is:

1. A system for providing fluid to a plant having its roots in aggregate, the system comprising:
   reservoir means for the retention of fluid;
   first at least partially absorbent means having a portion thereof in fluid transfer relation with the fluid in said reservoir means and having another portion external to the fluid in said reservoir means;
   second at least partially absorbent means having a portion thereof in fluid transfer relation with the aggregate in which the plant is rooted and having another portion thereof external to the aggregate;
   means for retaining at least part of said another portion of said first absorbent means in constant contacting relation to said another portion of said second absorbent means; and
   means for adjustably controlling the surface area of contact of said at least part of said another portion of said first absorbent means with said another portion of said second absorbent means for enabling control of the transfer of fluid from said reservoir means to the aggregate by means of capillary action through the varying contact surface of said first and second absorbent means.

2. The system according to claim 1 wherein said first and second at least partially absorbent means are wick means.

3. The system according to claim 1 wherein said reservoir means is a container means, and said first absorbent means is at least one wick member having an end thereof immersed within the fluid in said container means and the other end thereof extending out from the upper level of fluid in said container means.

4. The system according to claim 3 wherein said second absorbent means is at least one wick member.

5. A system for providing fluid to a plant having its roots in aggregate, the system comprising:
container means for the retention of fluid;
first at least partially absorbent means including at least one wick member having an end thereof immersed within the fluid in said container means in fluid transfer relation therewith and having the other end thereof extending out from the upper level of fluid in said container means;
second at least partially absorbent means including at least one wick member having a portion thereof in fluid transfer relation with the aggregate in which the plant is rooted and having another portion thereof external to the aggregate;
means for retaining said another portion of said first absorbent means in proximate abutting relation to said another portion of said second absorbent means; and
means for adjustably controlling the surface area of abutting contact for enabling control of the transfer of fluid from said reservoir means to the aggregate by means of capillary action through said first and second absorbent means, wherein said means for adjustably controlling includes a pivotable plate member, and said means for retaining includes means on said plate member for captively retaining one of said wick members thereon, pivoting of said plate member urging a surface of one of said wick members toward the adjacent surface of the other of said wick members.

6. The system according to claim 5 wherein said reservoir means includes means for retaining said container means in proximity to the aggregate in which the plant is rooted.

7. The system according to claim 1 wherein the plant is in a receptacle, and said reservoir means includes a container and hook means for releasably attaching said container to the receptacle.

8. A system for providing fluid to a plant within a receptacle and having its roots in aggregate, the system comprising:
reservoir means for the retention of fluid, said reservoir means including a container and hook means for releasably attaching said container to the receptacle;
housing means adjacent the upper end of said container;
first at least partially absorbent means having a portion thereof in fluid transfer relation with the fluid in said reservoir means and having another portion external to the fluid in said reservoir means;
second at least partially absorbent means having a portion thereof in fluid transfer relation with the aggregate in which the plant is rooted and having another portion thereof external to the aggregate;
means for retaining said another portion of said first absorbent means in proximate abutting relation to said another portion of said second absorbent means; and
means for adjustably controlling the surface area of abutting contact for enabling control of the transfer of fluid from said reservoir means to the aggregate by means of capillary action through said first and second absorbent means, wherein said means for adjustably controlling includes a plate member pivotally attached to said housing means, and said means for retaining include means on said plate member for captively retaining one of said wick members thereon, pivoting of said plate member urging a surface of one of said wick members toward the adjacent surface of the other of said wick members.

9. The system according to claim 8 further including spring means within said housing means for urging the other of said wick membres toward said one of said wick members.

10. The system according to claim 1 further including other fluid control means interposed between the abutting surfaces of said first and second members.

11. The system according to claim 10 wherein said other fluid control means includes a mesh having fluid transfer characteristics less than that of either of said first and second at least partially absorbent means.

12. A method for providing fluid to a plant having its roots in aggregate, the system comprising:
providing reservoir means for the retention of fluid;
providing a first at least partially absorbent means having a portion thereof in fluid transfer relation with the fluid in said reservoir and having another portion external to said reservoir means;
providing a second at least partially absorbent means having a portion thereof in fluid transfer relation with the aggregate in which the plant is rooted and having another portion thereof external to the aggregate;
retaining said another portion of said first absorbent means in constant contacting relation to said another portion of said second absorbent means; and
adjustably controlling the surface area of contacting relation for enabling control of the transfer of fluid from said reservoir means to the aggregate by means of capillary action through said first and second absorbent means.

13. The method according to claim 12 further including biasing one of said at least partially absorbent means toward the other of said absorbent means.

14. A method for providing fluid to a plant having its roots in aggregate, the system comprising:
providing reservoir means for the retention of fluid;
providing a first at least partially absorbent means having a portion thereof in fluid transfer relation with the fluid in said reservoir and having another portion external to said reservoir means;
providing a second at least partially absorbent means having a portion thereof in fluid transfer relation with the aggregate in which the plant is rooted and having another portion thereof external to the aggregate;
retaining said another portion of said first absorbent means in proximate abutting relation to said another portion of said second absorbent means;
ajdustably controlling the surface area of abutting contact for enabling control of the transfer of fluid from said reservoir means to the aggregate by means of capillary action through said first and second absorbent means; and
interposing other fluid control means between the abutting surfaces of said first and second members.

15. A system for providing fluid to a plant having its roots in aggregate, the system comprising:
a container for the retention of fluid;

housing means attachable adjacent the upper end of said container;

at least one at least partially absorbent first member having a portion thereof in fluid transfer relation with the fluid in said container and having another portion extending into said housing means;

at least one at least partially absorbent second member having a portion thereof in fluid transfer relation with the aggregate in which the plant is rooted and having another portion thereof extending into said housing means;

other means adjustably coupled to said housing means, said other means including means for retaining said another portion of said first member in constant contacting relation to said another portion of said second member, adjustment of said other means adjustably controlling the surface area of contacting relation for enabling control of the transfer of fluid from said container to the aggregate by means of capillary action through said first and second absorbent means; and spring means within said housing means for biasing said first and second members into abutting relation.

16. The system according to claim 15 wherein said first and second members are wick means.

17. The system according to claim 15 wherein said other means includes clamping means for retaining said another portion of said first member thereon.

18. A system for providing fluid to a plant having its roots in aggregate, the system comprising:

a container for the retention of fluid;

housing means attachable adjacent the upper end of said container;

at least one at least partially absorbent first member having a portion thereof in fluid transfer relation with the fluid in said container and having another portion extending into said housing means;

at least one at least partially absorbent second member having a portion thereof in fluid transfer relation with the aggregate in which the plant is rooted and having another portion thereof extending into said housing means;

other means adjustably coupled to said housing means, said other means including means for retaining said another portion of said first member in proximate abutting relation to said another portion of said second member, adjustment of said other means adjustably controlling the surface area of abutting contact for enabling control of the transfer of fluid from said container to the aggregate by means of capillary action through said first and second absorbent means;

spring means within said housing means for biasing said first and second members into abutting relation; and other fluid control means interposed between the abutting surface of said first and second members.

19. The system according to claim 15 wherein said other means for retaining and adjustably controlling includes a pivotable plate member, and means for captively retaining one of said wick members thereon, pivoting of said plate member urging a surface of one of said wick members toward the adjacent surface of the other of said wick members.

20. The system according to claim 15 wherein the plant is in a receptacle, and said system includes means for releasably attaching said container to the receptacle.

21. A method for providing fluid to a plant having its roots in aggregate, the system comprising:

providing reservoir means for the retention of fluid;

providing a first at least partially absorbent wick member having a portion thereof in fluid transfer relation with the fluid in said reservoir and having another portion external to said reservoir means;

providing a second at least partially absorbent wick member having a portion thereof in fluid transfer relation with the aggregate in which the plant is rooted and having another portion thereof external to the aggregate;

retaining said another portion of said first wick member in proximate abutting relation to said another portion of said second wick member;

biasing one of said wick members toward the other of said wick members; and adjustably controlling the surface area of abutting contact of said first and second wick members for enabling control of the transfer of fluid from said reservoir means to the aggregate by means of capillary action through said first and second wick members.

22. The method according to claim 14 wherein said other fluid control means includes a material having fluid transfer characteristics less than that of either of said first and second at least partially absorbent means.

23. The system according to claim 18 wherein said other fluid control means includes a mesh having fluid transfer characteristics less than that of either of said first and second at least partially absorbent means.

* * * * *